(12) United States Patent
Lokasaari et al.

(10) Patent No.: US 10,122,398 B2
(45) Date of Patent: Nov. 6, 2018

(54) SELECTING A SUBSCRIBER IDENTITY MODULE PROFILE HOST

(71) Applicant: Microsoft Technology Licensing, LLC, Redmond, WA (US)

(72) Inventors: Jussi Lokasaari, Espoo (FI); Antti Järvinen, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/755,047

(22) Filed: Jun. 30, 2015

(65) Prior Publication Data

US 2017/0005680 A1 Jan. 5, 2017

(51) Int. Cl.
*H04B 1/38* (2015.01)
*H04W 4/60* (2018.01)
*H04W 4/00* (2018.01)
*H04W 8/18* (2009.01)
*H04W 12/08* (2009.01)
*H04W 48/18* (2009.01)
*H04W 12/06* (2009.01)
*H04L 29/06* (2006.01)
*H04B 1/3816* (2015.01)

(52) U.S. Cl.
CPC ......... *H04B 1/3816* (2013.01); *H04L 63/102* (2013.01); *H04W 8/183* (2013.01); *H04W 12/06* (2013.01); *H04W 48/18* (2013.01); *H04W 4/003* (2013.01); *H04W 4/60* (2018.02); *H04W 12/08* (2013.01)

(58) Field of Classification Search
USPC ....................................................... 455/558
See application file for complete search history.

(56) References Cited

U.S. PATENT DOCUMENTS

| | | | |
|---|---|---|---|
| 6,856,818 B1* | 2/2005 | Ford | H04M 1/275 455/551 |
| 7,689,251 B2 | 3/2010 | Bae | |
| 8,364,960 B2* | 1/2013 | Baroffio | G06F 21/554 370/389 |
| 8,380,180 B2 | 2/2013 | Gnuschke | |
| 8,467,531 B2 | 6/2013 | Sun et al. | |
| 8,909,290 B2 | 12/2014 | Ruvalcaba et al. | |
| 9,009,475 B2 | 4/2015 | Hauck et al. | |

(Continued)

FOREIGN PATENT DOCUMENTS

| | | |
|---|---|---|
| KR | 20140058377 A | 5/2014 |
| WO | 2015076710 A1 | 5/2015 |

OTHER PUBLICATIONS

"Internet(Data/Wifi) Lock Lite", Jun. 1, 2015 Available at: https://play.google.com/store/apps/details?id=com.msappz.internetlocklite &hl=en.

(Continued)

*Primary Examiner* — Steven Kelley (57) ABSTRACT

In one example, an apparatus comprises a first profile host configured to allow storing at least one non-operational SIM profile. The apparatus further comprises a second profile host comprising a certified non-removable subscriber identity module and configured to allow storing at least one operational SIM profile. The apparatus further comprises a profile host selection unit configured to select only one of the first profile host and the second profile host to be active at any given time.

20 Claims, 8 Drawing Sheets

(56) References Cited

U.S. PATENT DOCUMENTS

| | | | | |
|---|---|---|---|---|
| 2002/0187808 | A1* | 12/2002 | Vallstrom | H04M 1/675 455/558 |
| 2006/0084472 | A1* | 4/2006 | Park | G06Q 20/32 455/558 |
| 2007/0167161 | A1* | 7/2007 | Cheng | H04W 8/265 455/435.1 |
| 2009/0170473 | A1* | 7/2009 | Bauernfeind | H04L 63/083 455/411 |
| 2011/0151836 | A1* | 6/2011 | Dadu | H04L 63/0853 455/411 |
| 2012/0036282 | A1* | 2/2012 | Chen | H04L 63/0428 710/9 |
| 2012/0309344 | A1 | 12/2012 | Ferrazzini et al. | |
| 2012/0322505 | A1* | 12/2012 | Lodeweyckx | H04W 12/06 455/558 |
| 2013/0316766 | A1* | 11/2013 | Nousiainen | H04B 1/3816 455/558 |
| 2014/0057597 | A1 | 2/2014 | Velusamy et al. | |
| 2014/0088731 | A1 | 3/2014 | Von Hauck | |
| 2015/0281198 | A1* | 10/2015 | Lee | H04W 8/18 726/7 |
| 2015/0312699 | A1* | 10/2015 | Rodgers | H04W 4/001 455/418 |

OTHER PUBLICATIONS

Sasukewa. "Boot level user password protection against unauthorized SIM or uses", Published on: Jun. 7, 2013, Available at: http://forum.xda-developers.com/showthread.php?t=2313864.

"Mobile Phone Security—Acma", Published on: Aug. 8, 2011, Available at: http://www.acma.gov.au/Citizen/Stay-protected/My-mobile-world/Content-and-services/mobile-phone-security-my-mobile-world-i-acma.

"Mobile Phone Security—Zicta", Jun. 1, 2015, Available at: http://www.zicta.zm/index.php?option=com_content&view=article&id=101:mobile-phone-security&Itemid=155.

"Android User Security Guide", Published on: Mar. 23, 2015, Available at: https://bluebox.com/android-user-security-guide/.

"Introduction—YotaPhone", Jun. 1, 2015, Available at: http://yotaphone.com/help/yotaphone2/en/16445.htm.

"Manage GSM, 3G, RUIM and Nextel SIM Cards, Read and Recover SMS Messages", Published on: Dec. 31, 2011 Available http://www.dekart.com/products/card_management/sim_manager/.

"Passwords and Locking", Published on: Jul. 26, 2013, Available at: http://docs.blackberry.com/en/smartphone_users/deliverables/50635/als1341500980899.jsp.

Wallen, Jack, "Pro Tip: Protect Your Android SIM Card With SIM Pin Lock", Published on: Jun. 26, 2014, Available at: http://www.techrepublic.com/article/pro-tip-protect-your-android-sim-card-with-sim-pin-lock/.

"Set up SIM Card Lock", Published on: Sep. 25, 2014, Available at: http://tamingthedroid.com/set-up-sim-card-lock.

"International Search Report and Written Opinion Issued in PCT Application No. PCT/US2016/037726", dated Aug. 29, 2016, 12 Pages.

"Second Written Opinion Issued in PCT Application No. PCT/US2016/037726", dated May 22, 2017, 7 Pages.

"International Preliminary Report on Patentability Issued in PCT Application No. PCT/US2016/037726", dated Sep. 8, 2017, 8 Pages.

* cited by examiner

SELECTING A SUBSCRIBER IDENTITY MODULE PROFILE HOST

BACKGROUND

Non-removable subscriber identity modules are becoming common in various mobile communication apparatuses, such as cellular phones, smartphones and tablet computers. As a result, there may be instances when the mobile communication apparatus is not in the end user's control, such as when the mobile communication apparatus is in repair, without the ability of the user to remove the subscriber identity module.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one example, an apparatus comprises a first profile host configured to allow storing at least one non-operational subscriber identity module (SIM) profile; a second profile host comprising a certified non-removable subscriber identity module and configured to allow storing at least one operational SIM profile; and a profile host selection unit configured to select only one of the first profile host and the second profile host to be active at any given time.

In another example, a mobile communication apparatus and a method have been discussed along with the features of the apparatus.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
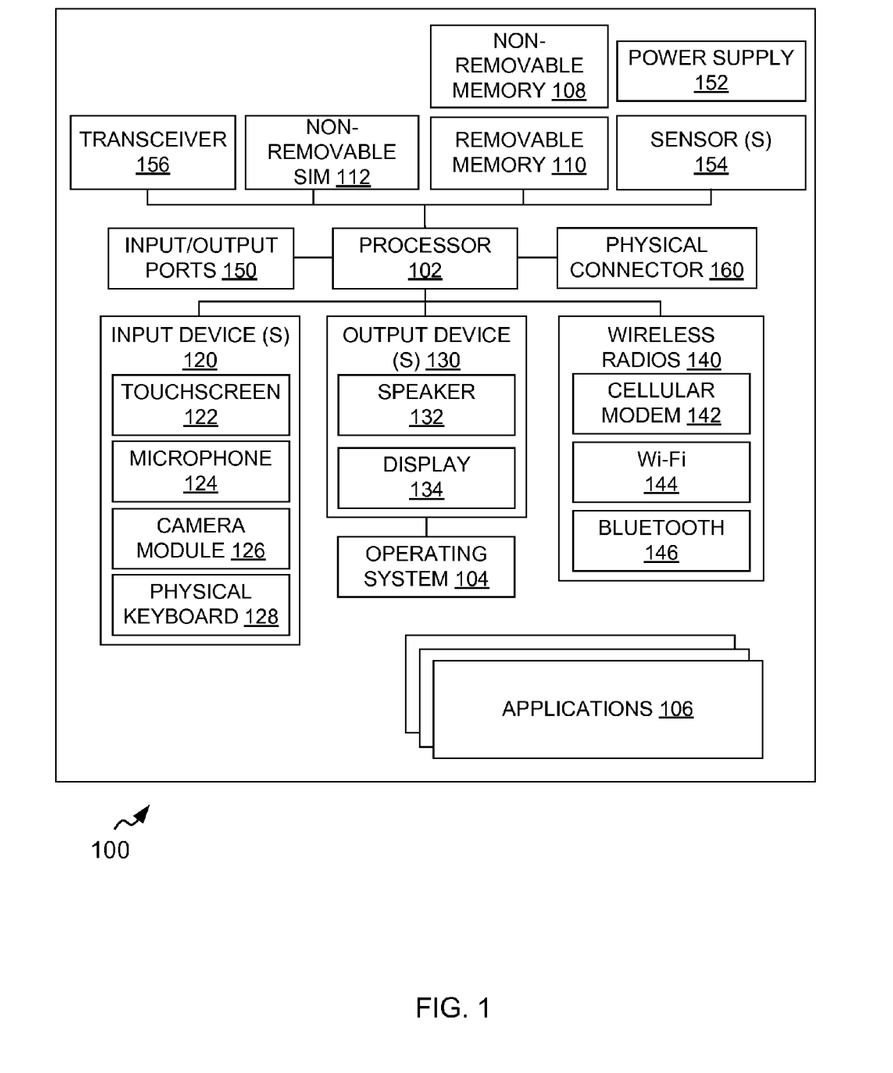
FIG. 1 illustrates an example of an apparatus capable of implementing example embodiments described herein.

FIG. 1 is a schematic block diagram of an apparatus 100 capable of implementing embodiments of the techniques described herein. It should be understood that the apparatus 100 as illustrated and hereinafter described is merely illustrative of one type of apparatus or an electronic device and should not be taken to limit the scope of the embodiments. As such, it should be appreciated that at least some of the components described below in connection with the apparatus 100 may be optional and thus in an example embodiment may include more, less or different components than those described in connection with the example embodiment of FIG. 1. As such, among other examples, the apparatus 100 could be any of mobile communication apparatuses, for example, mobile phones, a smartphones, tablet computers, mobile digital assistants, wearable communication apparatuses (such as smartwatches and the like) or any combination of the aforementioned, and other types of communication apparatuses, e.g. those incorporating a non-removable subscriber identity module (SIM).

The illustrated apparatus 100 includes a controller or a processor 102 (i.e.—a signal processor, microprocessor, ASIC, or other control and processing logic circuitry) for performing such tasks as signal coding, data processing, input/output processing, power control, and/or other functions. An operating system 104 controls the allocation and usage of the components of the apparatus 100 and support for one or more application programs 106. In addition, the application programs 106 can include common mobile applications, for instance, telephony applications, email applications, calendars, contact managers, web browsers, messaging applications, or any other application.

The illustrated apparatus 100 includes one or more memory components, for example, a non-removable memory 108 and/or removable memory 110. The non-removable memory 108 can include RAM, ROM, flash memory, a hard disk, or other well-known memory storage technologies. The removable memory 110 can include flash memory or smart cards. The one or more memory components can be used for storing data and/or code for running the operating system 104 and the applications 106. Example of data can include web pages, text, images, sound files, image data, video data, or other data sets to be sent to and/or received from one or more network servers or other devices via one or more wired or wireless networks. The electronic device 100 may further include a non-removable subscriber identity module (SIM), 112 such as for example an embedded subscriber identity module (eSIM), a virtual SIM, a software SIM, or the like. The non-removable SIM 112 typically stores information elements related to a mobile subscriber. A SIM is well known in Global System for Mobile Communications (GSM) communication systems, Code Division Multiple Access (CDMA) systems, or with third-generation (3G) wireless communication protocols such as Universal Mobile Telecommunications System (UMTS), CDMA1000, wideband CDMA (WCDMA) and time division-synchronous CDMA (TD-SCDMA), or with fourth-generation (4G) wireless communication protocols such as LTE (Long-Term Evolution). Furthermore, the non-removable SIM 112 may comprise network access applications (e.g USIM 3GPP 31.102, SIM 3GPP 51.011).

The apparatus 100 can support one or more input devices 120 and one or more output devices 130. Examples of the input devices 120 may include, but are not limited to, a touchscreen 122 (i.e., capable of capturing finger tap inputs, finger gesture inputs, multi-finger tap inputs, multi-finger gesture inputs, or keystroke inputs from a virtual keyboard or keypad), a microphone 124 (i.e., capable of capturing voice input), a camera module 126 (i.e., capable of capturing still picture images and/or video images) and a physical keyboard 128. Examples of the output devices 130 may include, but are not limited to a speaker 132 and a display 134. Other possible output devices (not shown) can include piezoelectric or other haptic output devices. Some devices can serve more than one input/output function. For example, the touchscreen 122 and the display 134 can be combined into a single input/output device.

In an embodiment, the apparatus 100 may comprise a wireless radio(s) 140. The wireless radio(s) 140 can be coupled to one or more antennas (not shown) and can support two-way communications between the processor 102 and external devices, as is well understood in the art. The wireless radio(s) 140 are shown generically and can include, for example, a cellular modem 142 for communicating at long range with the mobile communication network, a Wi-Fi 144 for communicating at short range with an external Bluetooth-equipped device or a local wireless data network or router, and/or a Bluetooth-compatible modem 146. The cellular modem 142 is typically configured for communication with one or more cellular networks, such as a GSM/3G network for data and voice communications within a single cellular network, between cellular networks, or between the mobile device and a public switched telephone network (PSTN).

The apparatus 100 can further include one or more input/output ports 150, a power supply 152, one or more sensors 154 for example, an accelerometer, a gyroscope, a compass, or an infrared proximity sensor for detecting the orientation or motion of the electronic device 100, a transceiver 156 (for wirelessly transmitting analog or digital signals) and/or a physical connector 160, which can be e.g. a USB port, IEEE 1394 (FireWire) port, and/or RS-232 port. The illustrated components are not required or all-inclusive, as any of the components shown can be deleted and other components can be added.

Figure 2:
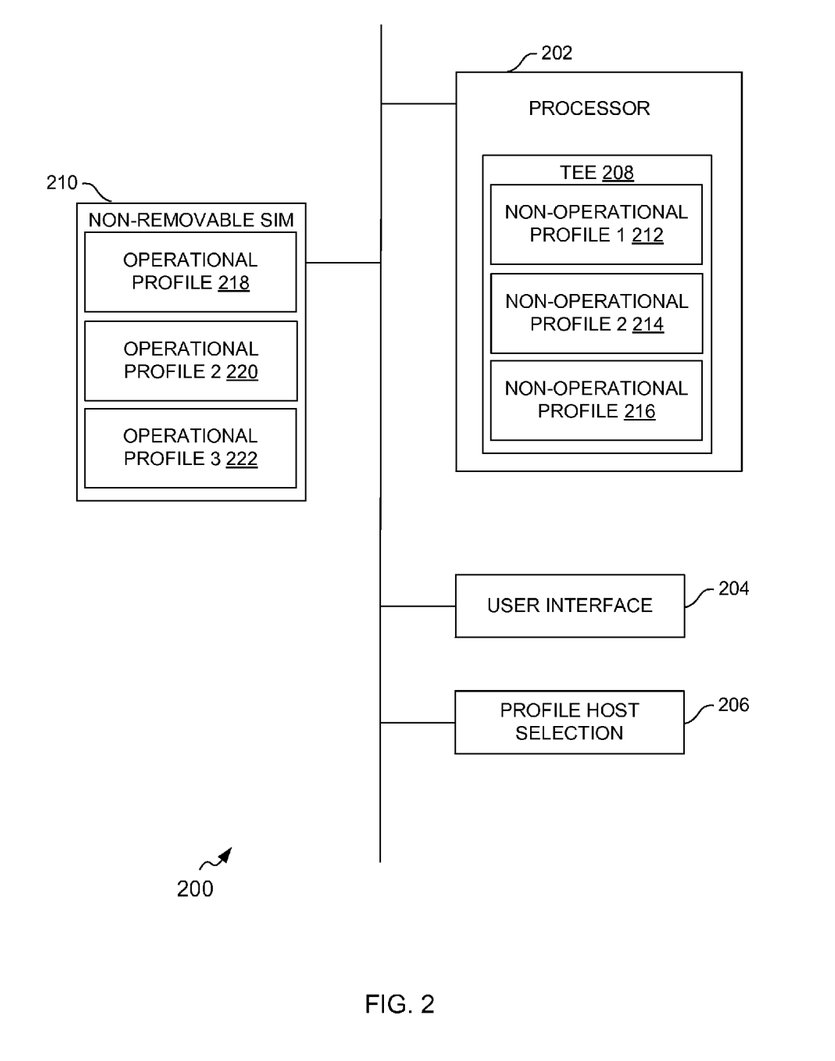
FIG. 2 is an example block diagram of an apparatus for selecting a SIM profile host in accordance with an example embodiment.

FIG. 2 illustrates an apparatus 200 for selecting a subscriber identity module (SIM) profile host, in accordance with an example embodiment. The apparatus 200 may be employed, for example, in the apparatus 100 of FIG. 1. However, it should be noted that the apparatus 200 may also be employed on a variety of other apparatuses, and therefore, embodiments should not be limited to application on apparatuses such as the apparatus 100 of FIG. 1. Furthermore, it should be noted that at least some of the apparatuses or elements described below may not be mandatory and thus some may be omitted in certain embodiments.

The apparatus 200 may include at least one processor for example, a processor 202 and at least one memory. Examples of the memory include, but are not limited to, volatile and/or non-volatile memories. For instance, the memory 204 may comprise volatile memory (i.e., registers, cache, RAM), non-volatile memory (i.e., ROM, EEPROM, flash memory, etc.), or some combination of the two. The memory stores software, for example, processing instructions that can, for example, implement the technologies described herein, upon execution. For example, the memory may be configured to store information, data, applications, instructions or the like for enabling the device 200 to carry out various functions in accordance with various example embodiments.

An example of the processor 202 may be the processor 102 of FIG. 1. The processor 202 may be embodied in a number of different ways. In an embodiment, the processor 202 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

A user interface 204 may be in communication with the processor 202. Examples of the user interface 204 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as light emitting diode display, thin-film transistor (TFT) display, liquid crystal displays, active-matrix organic light-emitting diode (AMOLED) display, a speaker, ringers, vibrators, and the like. In an example embodiment, the processor 202 may control at least some functions of one or more elements of the user interface 204, such as, for example, a speaker, ringer, microphone, display, and/or the like. The processor 202 may be configured to control one or more functions of one or more elements of the user interface 204 through computer program instructions, for example, software and/or firmware, stored on a memory, and/or the like, accessible to the processor 202.

The apparatus 200 comprises a first profile host 208 that is configured to allow storing at least one non-operational SIM profile 212, 214, 216. The apparatus 200 further comprises a second profile host 210 that is configured to allow storing at least one operational SIM profile 218, 220, 222. The second profile host 210 comprises a certified non-removable subscriber identity module, such as the non-removable subscriber identity module 112 of FIG. 1. The first profile host 208 may be arranged in a trusted execution environment (TEE). The non-removable subscriber identity module may be associated with a mobile communication apparatus. The associated mobile communication apparatus may comprise the apparatus 100 of FIG. 1. The associated mobile communication apparatus may have cellular connectivity capability.

The trusted execution environment (TEE) refers to a secure area of a processor or other chip, or the like. It is used to protect code and data loaded inside with respect to confidentiality and integrity. TEE implementation can utilize trusted platform module (TPM) defined by Trusted Computing Platform (TCG), or the like. Communication with the TEE can utilize a suitable SIM interface, such as 3GPP 11.11 and ETSI TS 102 221. Alternatively, a function call based interface or any other suitable communication arrangement may be implemented.

The at least one non-operational profile 212, 214, 216 may comprise at least one of a test profile and at least one provisioning profile. Test profiles may include test profiles used in modem protocol software testing, test profiles used in original equipment manufacturer (OEM) test networks, and/or test profiles used together with network simulators, test equipment or in device manufacturing or repair points. Herein, 'provisioning profile' refers to a non-operational profile that enables cellular connectivity for operational profile provisioning.

The apparatus 200 further comprises a profile host selection unit 206 that is configured to select one of the first profile host 208 and the second profile host 210 to be active at any given time. The profile host selection unit 206 may be further configured to deactivate the non-selected profile host.

The profile host selection unit 206 may be further configured to access a configuration value for communication between the non-removable subscriber identity module and its associated mobile communication apparatus in response to the second profile host 210 being selected to be active. The profile host selection unit 206 may be further configured to enable and disable the communication between the non-removable subscriber identity module and the associated mobile apparatus based on the accessed configuration value. The configuration value may be stored in protected secure memory of the TEE.

The profile host selection unit 206 may be further configured to change the accessed configuration value. The profile host selection unit 206 may be further configured to perform the changing of the accessed configuration value in response to either a local request or a remote request.

The profile host selection unit 206 may be further configured to access the configuration value in response to a successful end user authentication. The end user authentication may be performed locally or remotely utilizing a password based authentication, biometrical authentication or any other suitable input given by the end user. The TEE may be used for securing the implementation in device.

The profile host selection unit 206 may be controlled locally via a device user interface (using e.g. input device(s) 120 and/or output devices 130 of FIG. 1) and/or remotely via wired or wireless connectivity (using e.g. wireless radio 140 of FIG. 1).

In one example showing local control, for instance, in the case of a new SIM startup, device low layer code (such as a SIM driver) checks the configuration value. If indicated by the configuration value, SIM card interface will be reset allowing normal SIM initialization to occur. Alternatively, if indicated by the configuration value, SIM card interface will not be reset, thus preventing normal SIM initialization from happening. The end user may use an in-device user interface to provide a PIN code, password, biometrical authentication or any other input to change the configuration value. If the configuration value is changed while the SIM is active, the apparatus may trigger a SIM reset which will lead into a new SIM initialization where the configuration value is checked once again.

In one example showing remote control, if the phone display is broken or the device is unresponsive (for instance, due to battery error) to end user input, the end user has a valid need to disable the eSIM while the phone is not in his/her possession. The OEM can include the configuration value as part of an on-line end user service such as an on-line end user account or the like. An authenticated end user can deactivate the eSIM by changing its configuration value accordingly in the service. Status of the eSIM may be checked by the apparatus when it connects to the on-line end user account or the like. For example, if the mobile communication apparatus is broken, the associated on-line end user account may be checked based on e.g. international mobile station equipment identity (IMEI) of the mobile communication apparatus, or the like. The end user with the broken communication apparatus can authenticate to his or her on-line end user account with a correct password. Thus, status of the profile host selection unit can be changed in the on-line end user account even if the device is completely broken. Similarly, when the apparatus is connected to a repair tool of the OEM, the configuration value may also be checked from the on-line end user account. The repair tool can update the configuration value of the profile host selection unit e.g. by using a USB connection to a repair system to first check the configuration value from the on-line end user account, and then update the configuration value in the device. After repair, the end user may change the configuration value either locally or remotely allowing the eSIM to boot and operate normally. After this, the end user may continue to use his/her subscription(s) normally.

Figure 3:
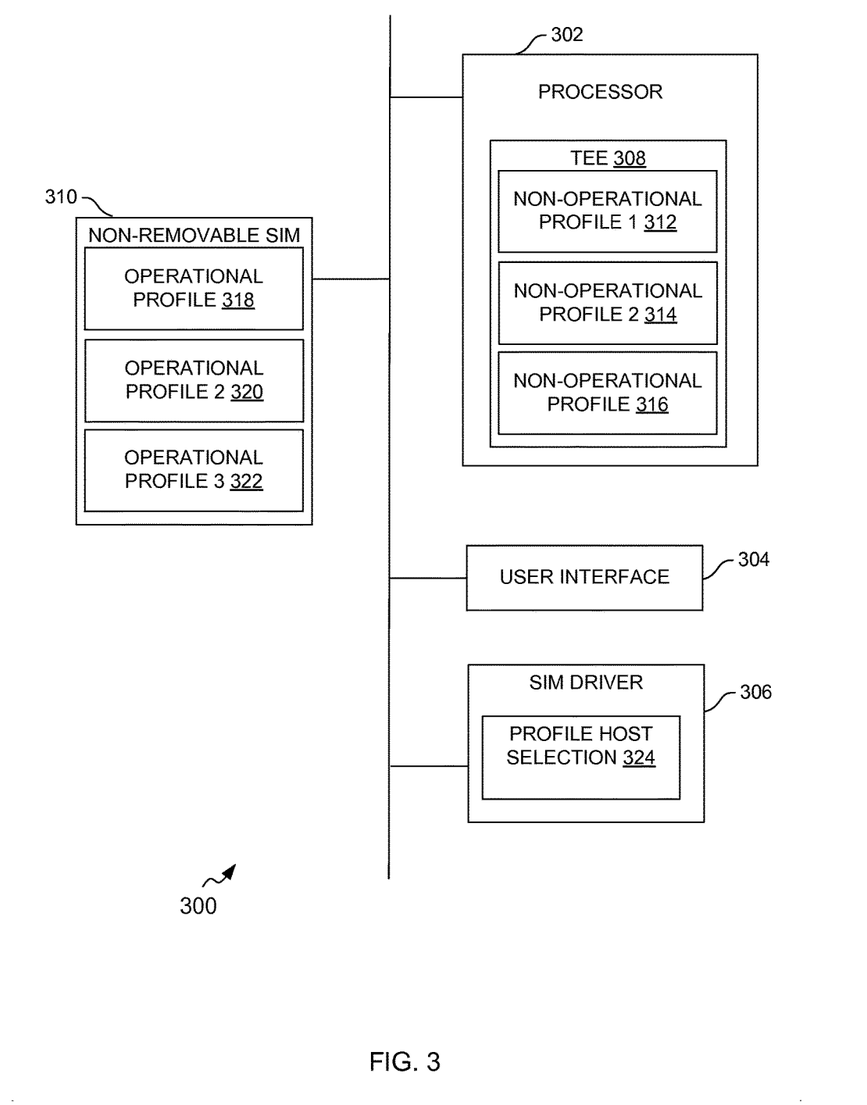
FIG. 3 is an example block diagram of an apparatus for selecting a SIM profile host in accordance with an example embodiment.

FIG. 3 illustrates an apparatus 300 for selecting a subscriber identity module (SIM) profile host, in accordance with an example embodiment. The apparatus 300 may be employed, for example, in the apparatus 100 of FIG. 1. However, it should be noted that the apparatus 300 may also be employed on a variety of other apparatuses, and therefore, embodiments should not be limited to application on apparatuses such as the apparatus 100 of FIG. 1. Furthermore, it should be noted that at least some of the apparatuses or elements described below may not be mandatory and thus some may be omitted in certain embodiments.

In the example of FIG. 3, the functionalities of the processor 302, user interface 304, first profile host 308, second profile host 310, non-operational profiles 312, 314, 316, operational profiles 318, 320, 322, and the profile host selection unit 324 are substantially similar to those of their counterparts in the example of FIG. 2, so their descriptions are not repeated here in detail. In the example of FIG. 3, the profile host selection unit 324 is implemented in a SIM driver 306.

Figure 4:
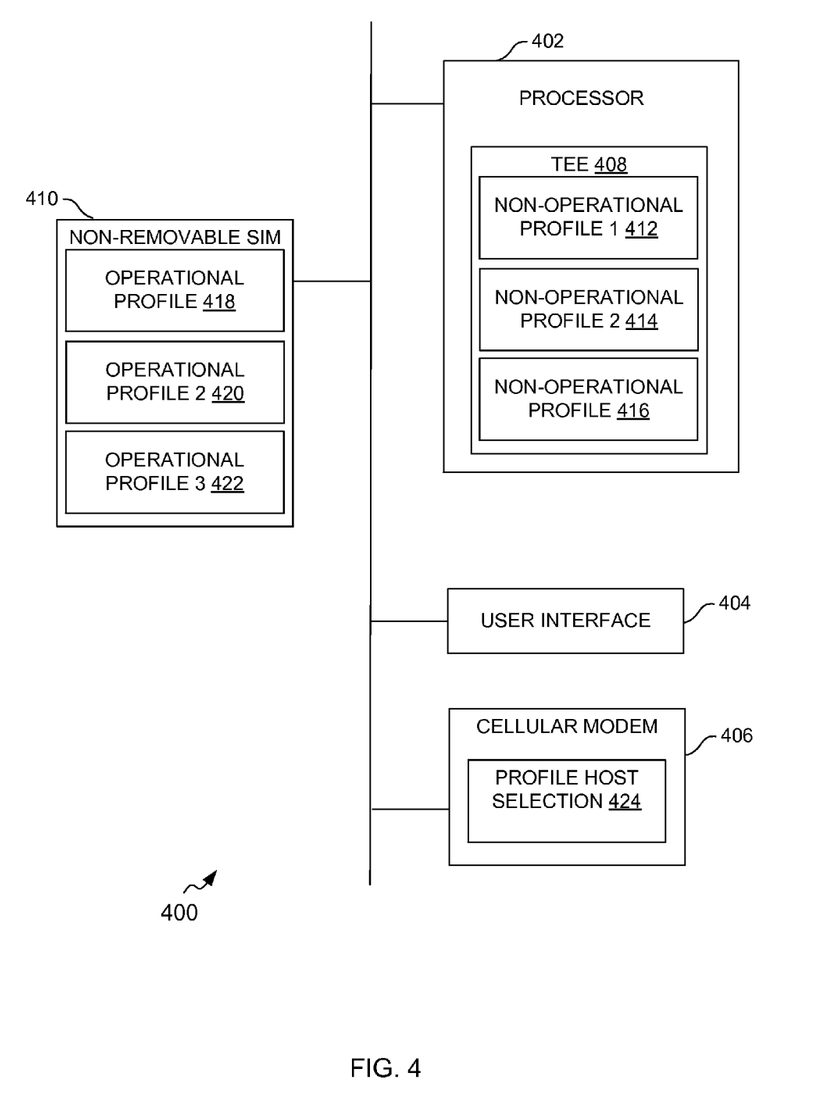
FIG. 4 is an example block diagram of an apparatus for selecting a SIM profile host in accordance with an example embodiment.

FIG. 4 illustrates an apparatus 400 for selecting a subscriber identity module (SIM) profile host, in accordance with an example embodiment. The apparatus 400 may be employed, for example, in the apparatus 100 of FIG. 1. However, it should be noted that the apparatus 400 may also be employed on a variety of other apparatuses, and therefore, embodiments should not be limited to application on apparatuses such as the apparatus 100 of FIG. 1. Furthermore, it should be noted that at least some of the apparatuses or elements described below may not be mandatory and thus some may be omitted in certain embodiments.

In the example of FIG. 4, the functionalities of the processor 402, user interface 404, first profile host 408, second profile host 410, non-operational profiles 412, 414, 416, operational profiles 418, 420, 422, and the profile host selection unit 424 are substantially similar to those of their counterparts in the example of FIG. 2, so their descriptions are not repeated here in detail. In the example of FIG. 4, the profile host selection unit 424 is implemented in a cellular modem 406, for instance as low level device software. The cellular modem 406 may be the cellular modem 142 of FIG. 1.

Figure 5:
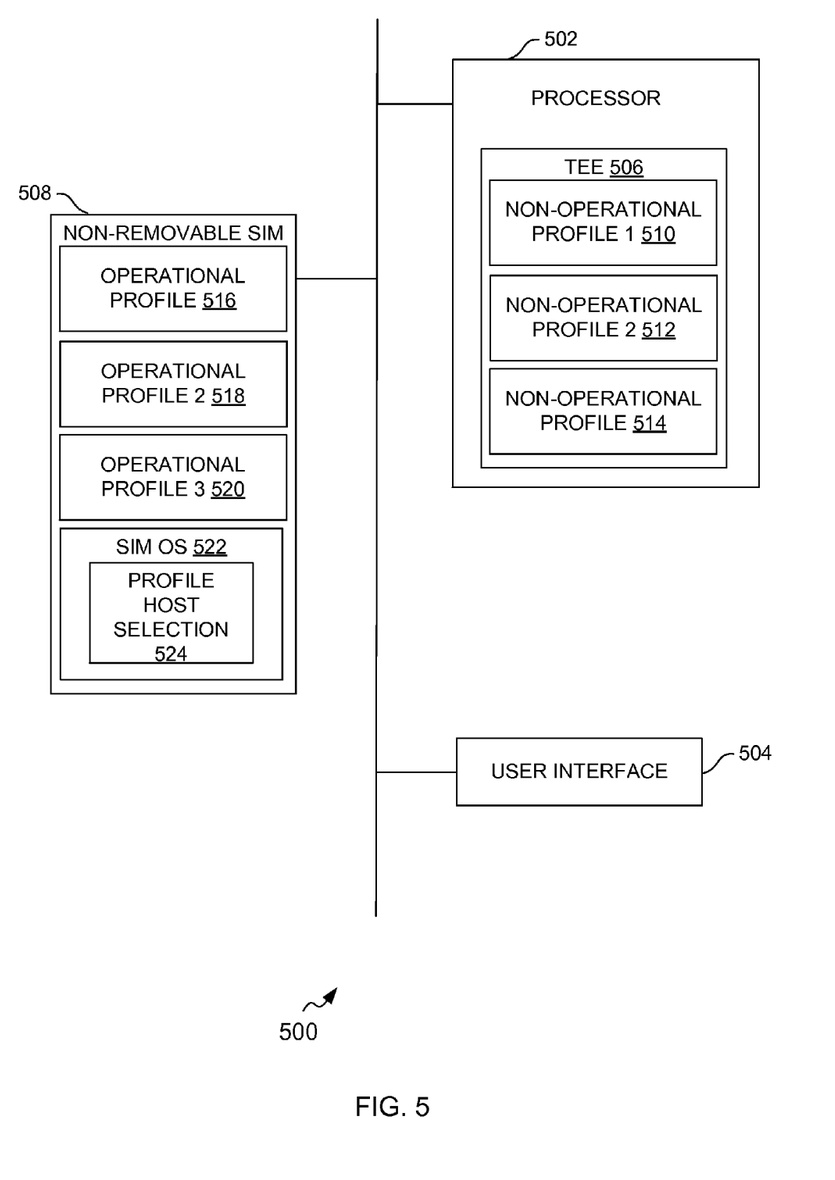
FIG. 5 is an example block diagram of an apparatus for selecting a SIM profile host in accordance with an example embodiment.

FIG. 5 illustrates an apparatus 500 for selecting a subscriber identity module (SIM) profile host, in accordance with an example embodiment. The apparatus 500 may be employed, for example, in the apparatus 100 of FIG. 1.

However, it should be noted that the apparatus 500 may also be employed on a variety of other apparatuses, and therefore, embodiments should not be limited to application on apparatuses such as the apparatus 100 of FIG. 1. Furthermore, it should be noted that at least some of the apparatuses or elements described below may not be mandatory and thus some may be omitted in certain embodiments.

In the example of FIG. 5, the functionalities of the processor 502, user interface 504, first profile host 506, second profile host 508, non-operational profiles 510, 512, 514, operational profiles 516, 518, 520, and the profile host selection unit 524 are substantially similar to those of their counterparts in the example of FIG. 2, so their descriptions are not repeated here in detail. In the example of FIG. 5, the profile host selection unit 524 is implemented in the operating system (OS) 522 of the non-removable subscriber identity module. The non-removable subscriber identity module may be the non-removable SIM 112 of FIG. 1.

Figure 6:
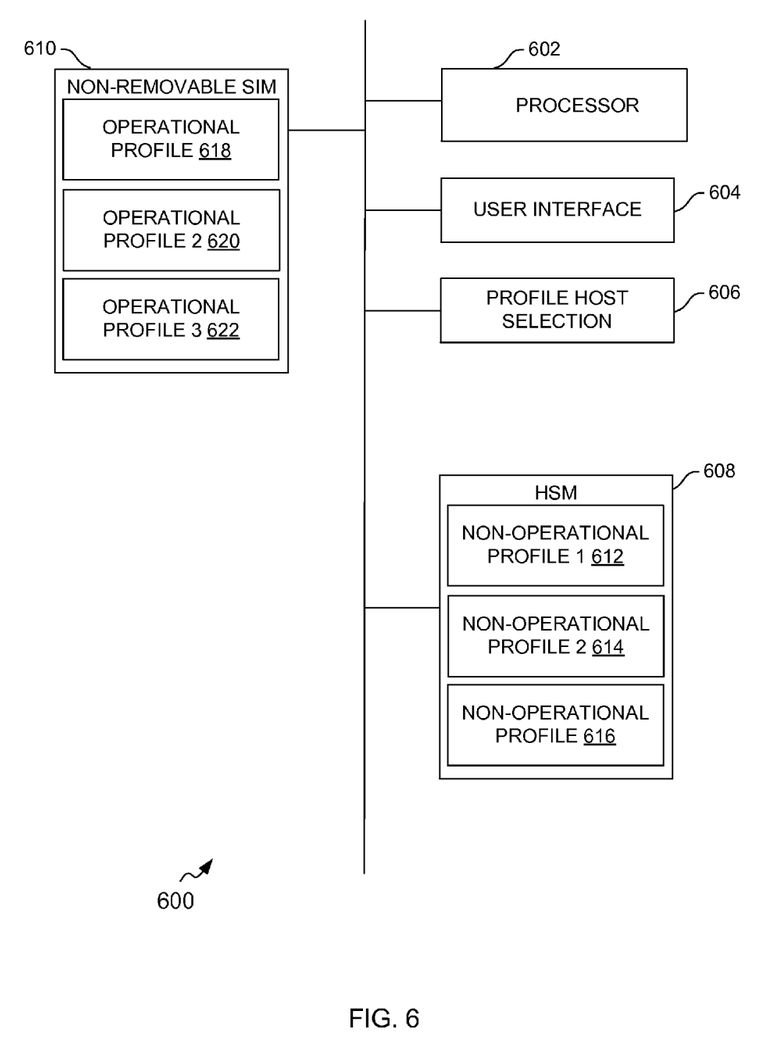
FIG. 6 is an example block diagram of an apparatus for selecting a SIM profile host in accordance with an example embodiment.

FIG. 6 illustrates an apparatus 600 for selecting a subscriber identity module (SIM) profile host, in accordance with an example embodiment. The apparatus 600 may be employed, for example, in the apparatus 100 of FIG. 1. However, it should be noted that the apparatus 600 may also be employed on a variety of other apparatuses, and therefore, embodiments should not be limited to application on apparatuses such as the apparatus 100 of FIG. 1. Furthermore, it should be noted that at least some of the apparatuses or elements described below may not be mandatory and thus some may be omitted in certain embodiments.

In the example of FIG. 6, the functionalities of the processor 602, user interface 604, profile host selection unit 606, first profile host 608, second profile host 610, non-operational profiles 612, 614, 616, and operational profiles 618, 620, 622 are substantially similar to those of their counterparts in the example of FIG. 2, so their descriptions are not repeated here in detail. In the example of FIG. 6, the first profile host 608 is implemented in a hardware security module (HSM). The HSM may be certified or non-certified. Additionally/alternatively, the HSM may store the configuration value for communication between the non-removable subscriber identity module and its associated mobile communication apparatus.

Figure 7:
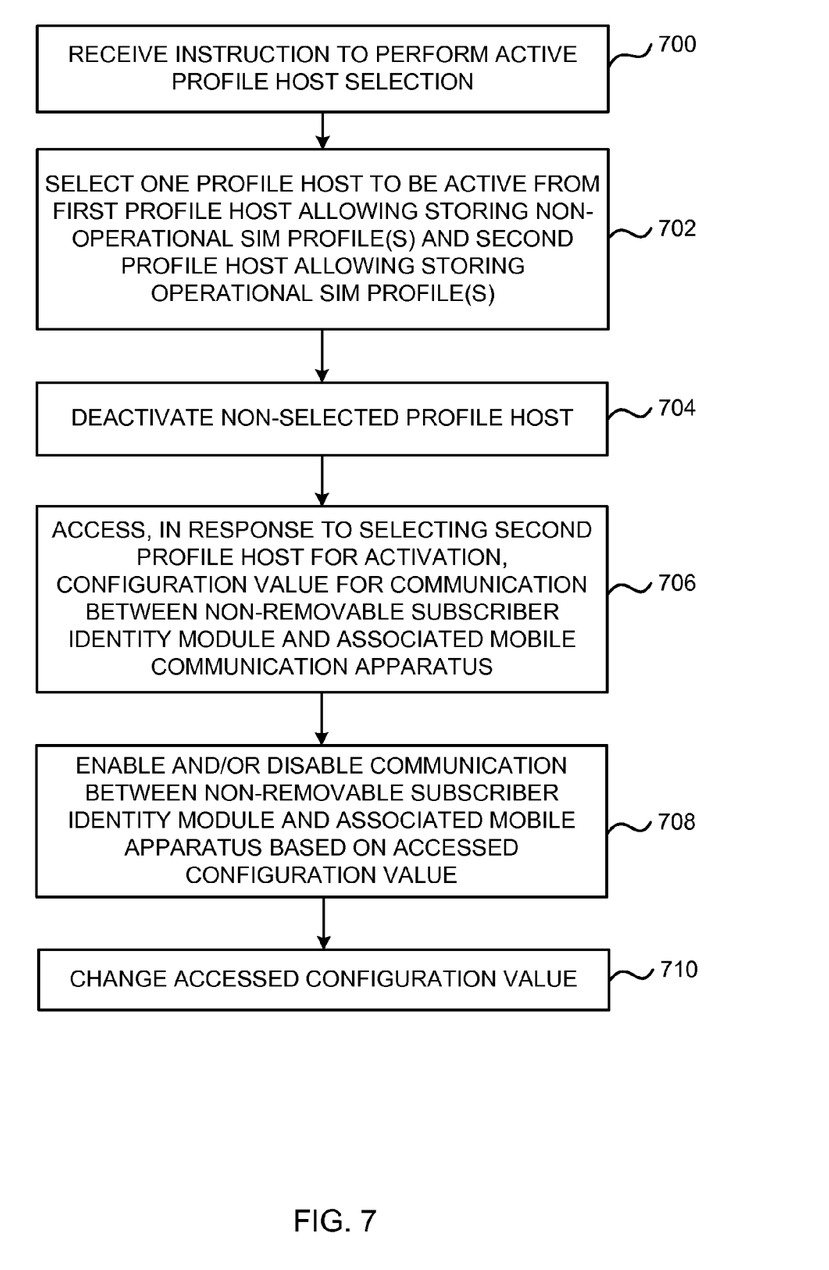
FIG. 7 illustrates an example flow diagram of a method for selecting a SIM profile host in accordance with an example embodiment.

FIG. 7 illustrates an example flow diagram of a method of selecting a subscriber identity module (SIM) profile host, in accordance with an example embodiment. Operations of the method of FIG. 7 may be performed by, for example, the apparatus 200 of FIG. 2, the apparatus 300 of FIG. 3, the apparatus 400 of FIG. 4, the apparatus 500 of FIG. 5 and/or the apparatus 600 of FIG. 6. For example, the profile host selection unit 206, profile host selection unit 324, profile host selection unit 424, profile host selection unit 524 or profile host selection unit 606 may carry out step 700. The profile host selection unit 206, profile host selection unit 324, profile host selection unit 424, profile host selection unit 524 or profile host selection unit 606 may carry out step 702. The profile host selection unit 206, profile host selection unit 324, profile host selection unit 424, profile host selection unit 524 or profile host selection unit 606 may carry out step 704. The profile host selection unit 206, profile host selection unit 324, profile host selection unit 424, profile host selection unit 524 or profile host selection unit 606 may carry out step 706. The profile host selection unit 206, profile host selection unit 324, profile host selection unit 424, profile host selection unit 524 or profile host selection unit 606 may carry out step 708. The profile host selection unit 206, profile host selection unit 324, profile host selection unit 424, profile host selection unit 524 or profile host selection unit 606 may carry out step 710.

At 700, the method includes receiving an instruction to perform an active profile host selection.

At 702, the method includes selecting a only one profile host to be active at any given time from one of a first profile host allowing storing at least one non-operational SIM profile and a second profile host allowing storing at least one operational SIM profile, the second profile host comprising a certified non-removable subscriber identity module. As discussed above, the at least one non-operational profile may comprise at least one of a test profile and a provisioning profile.

At 704, the method includes deactivating the non-selected profile host.

At 706, the method includes accessing, in response to selecting the second profile host to be active, a configuration value for communication between the non-removable subscriber identity module and an associated mobile communication apparatus having cellular connectivity capability. The accessing of the configuration value may be performed in response to a successful end user authentication.

At 708, the method includes one of enabling and disabling the communication between the non-removable subscriber identity module and the associated mobile apparatus based on the accessed configuration value.

At 710, the method includes changing the accessed configuration value. The changing of the accessed configuration value may be performed in response to one of a local request and a remote request.

Figure 8:
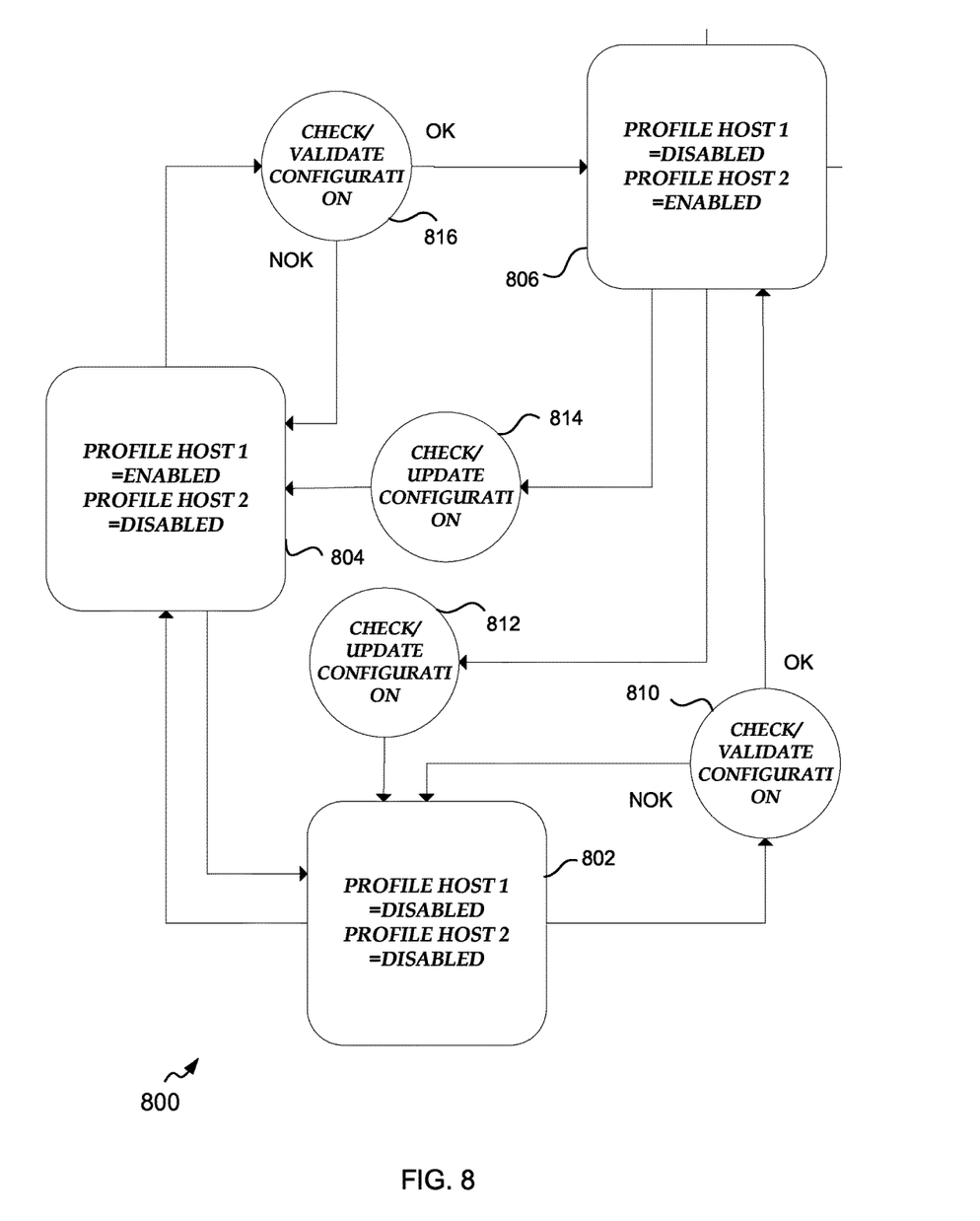
FIG. 8 illustrates an example state diagram of SIM profile hosts in accordance with an example embodiment.

FIG. 8 illustrates an example state diagram 800 of subscriber identity module (SIM) profile hosts, in accordance with an example embodiment. In first state 802, both the first and second SIM profile hosts are disabled and access to their profile storages is restricted. From state 802 the apparatus can move to state 804 where the first SIM profile host is enabled without limitations. Also moving back to state 802 from 804 is possible without limitations. If the apparatus is executing a state transition either from state 802 or 804 to 806, where the second SIM profile host is enabled, the apparatus may check 810, 816 the state of the configuration value allowing communication with the second SIM profile host. If the state transition is password protected, the apparatus may validate the configuration value from apparatus end user before state transition to 806 is possible. If the validation of the configuration value fails, the apparatus will return to its original state (802 or 804) accordingly. In state 806, where the second SIM profile host is enabled, transition to states 802 or 804 can happen. During the state transition, it is be possible for the apparatus end user or the like to update 812, 814 the configuration value of second SIM profile host access. This can happen, for example, by asking a new password from the end user. The configuration value is updated before entry to states 802 or 804 is executed.

Computer executable instructions may be provided using any computer-readable media that is accessible by computing based devices. Computer-readable media may include, for example, computer storage media such as memory and communications media. Computer storage media, such as memory includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing based devices it will be appreciated that the storage may be distributed or located remotely and accessed via a network or other communication link, for example by using a communication interface.

At least some of the examples disclosed in FIGS. 1-8 are able to provide performance improvement in non-operational profile provisioning. For example, in manufacturing at least some of the examples disclosed in FIGS. 1-8 are able to provide faster device flashing and testing in production line. Also, there is no need for non-removable SIM provisioning during manufacturing, and provisioning profile installation can be a part of device customization. In testing, multiple stored test profiles may allow faster testing sequences because there is no need to communicate with a remote provisioning platform. For repair and refurbishment, the TEE can contain required test profiles when the device is coming to a service point or they can be downloaded by testing tools. Also, there is no need to remove operational profiles from the non-removable SIM to allow repair related testing. Furthermore, access to the non-removable SIM can be deactivated during the repair. Furthermore, there's no online connectivity requirement outside manufacturer controlled platforms. Furthermore, at least some of the examples disclosed in FIGS. 1-8 are able to provide bill of material reductions, smaller non-removable SIM internal memory requirements, and smaller cryptographic payload for the non-removable SIM. Furthermore, there's no need for real time integration interfaces between the manufacturer controlled platforms and 3rd party provisioning platforms. Furthermore, TEE implementation can have multiple active profiles. At least some of the examples disclosed in FIGS. 1-8 are able to provide a selection logic that doesn't block normal non-removable SIM operation in operational mobile network operator (MNO) use cases and enables non-removable SIM provisioning with TEE profile when needed.

At least some of the examples disclosed in FIGS. 1-8 are able to provide flexible device testing for a device manufacturer in research and development, production and repair. For example, profiles can be installed easily using local connectivity (such as USB, NCF, WiFi), Profiles can be flashed to phone memory (research and development software), and manufacturers or TEE provisioning system can be used in profile management. This may also allow updating non-operational profiles as part of manufacturer software updates making non-operational profile update more straightforward and cost efficient for the manufacturer.

At least some of the examples disclosed in FIGS. 1-8 are able to provide manufacturing (including testing) of a mobile communication apparatus having cellular connectivity capability without end user ability to activate it. Later, the end user can activate the cellular modem e.g. by purchase from an on-line store. In an embodiment, this may be implemented by changing the status of the profile host selection unit from the first profile host to the certified non-removable SIM.

Furthermore, a manufacturer can use TEE together with a provisioning profile. Accordingly, the manufacturer can choose operators for the provisioning service. Special agreements with Mobile Network Operators (MNOs) can be done for the provisioning service, and the security level of provisioning connectivity can be agreed with provisioning service providers. At least some of the examples disclosed in FIGS. 1-8 are able to provide worldwide cellular provisioning in co-operation with selected operators. Non-operational profiles can be updated as a part of regular phone software updates.

At least some of the examples disclosed in FIGS. 1-8 are able to provide securing the end user from fraudulent use of subscriptions while the device is in repair and/or during refurbishment of non-removable SIM devices. At least some of the examples disclosed in FIGS. 1-8 are able to provide end user privacy protection, since by disabling wireless connectivity during repair the end user's data cannot be updated during the repair. At least some of the examples disclosed in FIGS. 1-8 are able to provide an easy way for the end user to prepare the device for repair by local disabling of profiles when the device is operational and by remote disabling of profiles when the device is non-operational. Accordingly, the end user may loan the device and deactivate all his/her subscriptions while the device is not controlled by him/her. A manufacturer can repair non-removable SIM devices without fraud risk and without connectivity requirements to a 3rd party provisioning platform.

At least some of the examples disclosed in FIGS. 1-8 are able to provide an anti-theft solution by deactivating both profile hosts.

An embodiment of an apparatus comprises a first profile host configured to allow storing at least one non-operational subscriber identity module (SIM) profile; a second profile host comprising a certified non-removable subscriber identity module and configured to allow storing at least one operational SIM profile; and a profile host selection unit configured to select only one of the first profile host and the second profile host to be active at any given time.

In an embodiment, alternatively or in addition to the above described embodiments, the profile host selection unit is further configured to deactivate the non-selected profile host.

In an embodiment, alternatively or in addition to the above described embodiments, the non-removable subscriber identity module is associated with a mobile communication apparatus.

In an embodiment, alternatively or in addition to the above described embodiments, in response to selecting the second profile host to be active, the profile host selection unit is further configured to access a configuration value for communication between the non-removable subscriber identity module and an associated mobile communication apparatus having cellular connectivity capability.

In an embodiment, alternatively or in addition to the above described embodiments, the profile host selection unit is further configured to one of enable and disable the communication between the non-removable subscriber identity module and the associated mobile apparatus based on the accessed configuration value.

In an embodiment, alternatively or in addition to the above described embodiments, the profile host selection unit is further configured to change the accessed configuration value.

In an embodiment, alternatively or in addition to the above described embodiments, the profile host selection unit is further configured to perform the changing of the accessed configuration value in response to one of a local request and a remote request.

In an embodiment, alternatively or in addition to the above described embodiments, the profile host selection unit is further configured to perform the accessing of the configuration value in response to a successful end user authentication.

In an embodiment, alternatively or in addition to the above described embodiments, the at least one non-operational profile comprises at least one of a test profile and a provisioning profile.

In an embodiment, alternatively or in addition to the above described embodiments, the first profile host is arranged in one of a trusted execution environment and a hardware security module.

An embodiment of a mobile communication apparatus comprises a first profile host configured to allow storing at least one non-operational subscriber identity module (SIM) profile s; a second profile host comprising a certified non-removable subscriber identity module associated with the mobile communication apparatus, and configured to allow storing at least one operational SIM profile; and a profile host selection unit configured to select only one of the first profile host and the second profile host to be active at any given time.

In an embodiment, alternatively or in addition to the above described embodiments, the profile host selection unit is further configured to deactivate the non-selected profile host.

An embodiment of a method comprises receiving an instruction to perform an active profile host selection; and selecting only one profile host to be active at any given time from one of a first profile host allowing storing at least one non-operational subscriber identity module (SIM) profile and a second profile host allowing storing at least one operational SIM profile, the second profile host comprising a certified non-removable subscriber identity module.

In an embodiment, alternatively or in addition to the above described embodiments, the non-selected profile host is deactivated.

In an embodiment, alternatively or in addition to the above described embodiments, a configuration value for communication between the non-removable subscriber identity module and an associated mobile communication apparatus having cellular connectivity capability is accessed in response to selecting the second profile host to be active.

In an embodiment, alternatively or in addition to the above described embodiments, the communication between the non-removable subscriber identity module and the associated mobile apparatus is one of enabled and disabled based on the accessed configuration value.

In an embodiment, alternatively or in addition to the above described embodiments, the accessed configuration value is changed.

In an embodiment, alternatively or in addition to the above described embodiments, the changing of the accessed configuration value is performed in response to one of a local request and a remote request.

In an embodiment, alternatively or in addition to the above described embodiments, the accessing of the configuration value is performed in response to a successful end user authentication.

In an embodiment, alternatively or in addition to the above described embodiments, the at least one non-operational profile comprises at least one of a test profile and a provisioning profile.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include mobile telephones (including smart phones), tablet computers and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims, and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. An system, comprising:
   a remote server; and
   an apparatus comprising:
   a first profile host configured to allow storing at least one non-operational subscriber identity module (SIM) profile;
   a second profile host comprising a certified non-removable SIM and configured to allow storing at least one operational SIM profile; and
   a profile host selection unit configured to select only one of the first profile host and the second profile host to be active at any given time; and
   wherein the profile host selection unit is further configured to enable communication between the non-removable SIM and the associated mobile apparatus based on a first configuration value that enables communication between the non-removable SIM and the associated mobile apparatus, and after the communication between the non-removable SIM and the associated mobile apparatus is enabled:
      receiving, by the remote sever, a second configuration value entered by a user of the associated mobile apparatus; and
   the apparatus:
      requesting, from a remote server, a current configuration value;
      based on the request, receiving, from the remote server, the second configuration value that disables communication between the non-removable SIM and the associated mobile apparatus;
      based on the second configuration value, disabling the enabled communications between the non-removable SIM and the associated mobile apparatus such that no SIM communicates with the associated mobile apparatus.

2. The system as claimed in claim 1, wherein the profile host selection unit is further configured to deactivate the non-selected profile host.

3. The system as claimed in claim 1, wherein the non-removable subscriber identity module is associated with a mobile communication apparatus.

4. The system as claimed in claim 1, wherein, in response to a startup of the mobile apparatus, the profile host selection unit is further configured to access the current configuration value.

5. The system as claimed in claim 4, wherein the profile host selection unit is further configured to change the current configuration value.

6. The system as claimed in claim 5, wherein the profile host selection unit is further configured to perform the changing of the current configuration value in response to one of a local request and a remote request.

7. The system as claimed in claim 4, wherein the profile host selection unit is further configured to perform the accessing of the current configuration value in response to a successful end user authentication.

8. The system as claimed in claim 1, wherein the at least one non-operational profile comprises at least one of a test profile and a provisioning profile.

9. The system as claimed in claim 1, wherein the first profile host is arranged in one of a trusted execution environment and a hardware security module.

10. A method, comprising:
   receiving an instruction to perform an active profile host selection;
   selecting, from a mobile communications apparatus, a first profile host to be active, the first profile host storing an operational subscriber identity module (SIM) profile, the mobile communications apparatus further comprising a second profile host storing at least one non-operational SIM profile, the second profile host comprising a certified non-removable subscriber identity module, and wherein only one profile host is active at any given time; and
   upon receiving a request to select the second profile host:
      activating the second profile host and enable the communication between the non-removable SIM and the associated mobile apparatus based on a first configuration value that enables communication between the non-removable SIM and the associated mobile apparatus;
      deactivating the first profile host; and
   after enabling the communication between the non-removable SIM and the associated mobile apparatus:
      receiving, by the remote server, a second configuration value entered by a user of the associated mobile apparatus;
      request, from the remote server, a current configuration value;
      based on the request, receive, from the remote server, the second configuration value that disables communication between the non-removable SIM and the associated mobile apparatus;

based on the second configuration value, disable the enabled communications between the non-removable SIM and the associated mobile apparatus such that no SIM communicates with the associated mobile apparatus.

11. The method as claimed in claim 10, wherein a non-selected profile host is deactivated.

12. The method as claimed in claim 10, further comprising accessing, in response to a startup of the mobile apparatus, the current configuration value.

13. The method as claimed in claim 12, further comprising one of enabling and disabling the communication between the non-removable subscriber identity module and the associated mobile apparatus based on the current configuration value.

14. The method as claimed in claim 12, further comprising changing the current configuration value.

15. The method as claimed in claim 14, wherein the changing of the current configuration value is performed in response to one of a local request and a remote request.

16. The method as claimed in claim 12, wherein the accessing of the current configuration value is performed in response to a successful end user authentication.

17. The method as claimed in claim 10, wherein the at least one non-operational profile comprises at least one of a test profile and a provisioning profile.

18. One or more computer-readable storage devices comprising computer-executable instructions, that when executed by one or more processors, cause the one or more processors to perform the following:

receiving an instruction to perform an active profile host selection;

selecting, from a mobile communications apparatus, a first profile host to be active, the first profile host storing an operational subscriber identity module (SIM) profile, the mobile communications apparatus further comprising a second profile host storing at least one non-operational SIM profile, the second profile host comprising a certified non-removable subscriber identity module, and wherein only one profile host is active at any given time; and upon receiving a request to select the second profile host:

activating the second profile host and enable the communication between the non-removable SIM and the associated mobile apparatus based on a first configuration value that enables communication between the non-removable SIM and the associated mobile apparatus;

deactivating the first profile host; and after enabling the communication between the non-removable SIM and the associated mobile apparatus:

receiving, by the remote server, a second configuration value entered by a user of the associated mobile apparatus;

request, from the remote server, a current configuration value;

based on the request, receive, from the remote server, the second configuration value that disables communication between the non-removable SIM and the associated mobile apparatus;

based on the second configuration value, disable the enabled communications between the non-removable SIM and the associated mobile apparatus such that no SIM communicates with the associated mobile apparatus.

19. The one or more computer-readable storage devices of claim 18, wherein a non-selected profile host is deactivated.

20. The one or more computer-readable storage devices of claim 18, wherein the computer-executable instructions further cause the one or more processors to perform the following: accessing, in response to a startup of the mobile apparatus, the current configuration value.

* * * * *